United States Patent
Chan et al.

(10) Patent No.: US 7,236,040 B2
(45) Date of Patent: Jun. 26, 2007

(54) METHOD AND APPARATUS FOR GENERATING MULTIPHASE CLOCKS

(75) Inventors: Ronny C. Chan, North York (CA); Mikhail Rodionov, Markham (CA); Karen Wan, Tai Kok Tsui (HK); Richard W. Fung, Markham (CA); Paul Edelshteyn, Toronto (CA); Ramesh Senthinathan, Richmond Hill (CA)

(73) Assignee: ATI Technologies Inc., Markham, Ontario (CA)

( * ) Notice: Subject to any disclaimer, the term of this patent is extended or adjusted under 35 U.S.C. 154(b) by 0 days.

(21) Appl. No.: 11/004,754

(22) Filed: Dec. 3, 2004

(65) Prior Publication Data

US 2006/0119408 A1 Jun. 8, 2006

(51) Int. Cl.
  *G06F 1/04* (2006.01)
(52) U.S. Cl. ........................... 327/295; 327/156
(58) Field of Classification Search ............... 327/156, 327/158, 161, 269, 291, 295
  See application file for complete search history.

(56) References Cited

U.S. PATENT DOCUMENTS

| | | | |
|---|---|---|---|
| 5,304,954 A | 4/1994 | Saito et al. | |
| 5,336,939 A * | 8/1994 | Eitrheim et al. | 327/291 |
| 5,477,181 A | 12/1995 | Li et al. | |
| 5,977,837 A | 11/1999 | Byrn et al. | |
| 6,150,886 A | 11/2000 | Shimomura | |
| 6,194,932 B1 * | 2/2001 | Takemae et al. | 327/158 |
| 6,392,462 B2 | 5/2002 | Ebuchi et al. | |
| 6,600,355 B1 * | 7/2003 | Nguyen | 327/298 |

OTHER PUBLICATIONS

Tournier, Eric et al.; A 14,5 GHz—0,35 um frequency divider for dual-modulus prescaler; IEEE; 2002; pp. 227-230.

* cited by examiner

*Primary Examiner*—Kenneth B. Wells
(74) *Attorney, Agent, or Firm*—Vedder, Price, Kaufman & Kammholz, P.C.

(57) ABSTRACT

A multiphase clock generating circuit includes a multiphase clock generator that produces a plurality of multiphase output signals at a first frequency and a multiphase divider with delayed reset control. The multiphase divider with delayed reset control is operatively coupled to receive the plurality of multiphase output signals at the first frequency and further operative to produce a plurality of multiphase output signals at a second frequency based on reset control information. As a result, an interface can be supplied with and switch between multiphase clock at different frequencies within a short amount of time with reduced power consumption and circuit area.

36 Claims, 15 Drawing Sheets

METHOD AND APPARATUS FOR GENERATING MULTIPHASE CLOCKS

FIELD OF THE INVENTION

The invention generally relates to multiphase clock generating circuits and more particularly to multiphase clock generating circuits capable of producing two or more multiphase signals at different frequencies.

BACKGROUND OF THE INVENTION

In many of today's microprocessor interfaces or other interfaces, a low frequency clock signal such as 250 MHz is required on initial boot-up of, for example, the central processing unit (CPU) or other circuit. However, after the CPU finishes initializing all required states, the microprocessor requires a clock signal at a higher frequency, such as 1 GHz, to run at full speed. Because many microprocessor interfaces require multiphase clock inputs, they may be generically labeled "interfaces requiring multiphase clocks." A high speed point-to-point data transfer structure, such as HyperTransport® developed by a consortium of companies is an example of such an interface.

FIG. 1 shows a prior art configuration of a single multiphase clock generator 104 generating a plurality of multiphase output signals 120 from a reference clock signal 103. It is recognized that the words "signal" and "clock" as used throughout this disclosure shall include both digital and analog information provided by a particular source. The reference clock signal 103 may be provided by a reference clock source 102, such as a host processor, not shown, or other suitable clock source. As illustrated, the plurality of multiphase output signals 120 generated by the multiphase clock generator 104 are output to an interface requiring multiphase clocks 106. Generally, multiphase voltage controlled oscillator (VCO) clocks 122 are generated by a phase locked loop (PLL) 108 or other clock source buffered by each stage of a voltage controlled oscillator (VCO) 110. The multiphase VCO clocks 122 share a common frequency, but have different phases. As recognized, the number of stages within the VCO 110 will determine the phase difference between each signal among the multiphase VCO clocks 122. For example, a four stage differential VCO can produce four differential signals that are 45 degrees apart.

The reference clock signal 103 is fed into the phase frequency detector (PFD) 112. The PFD 112 compares the reference clock signal 103 to the feedback clock signal 115 as provided by feedback dividers 114. The PFD 112 then outputs an up or down voltage signal 113 to the charge pump/loop filter 116. The charge pump/loop filter 116 receives the voltage signal 113 and pumps up or down the current accordingly and translates it into a control voltage. Based upon the current and control voltage from the charge pump/loop filter 116, the VCO 110 can be sped up or slowed down accordingly. The output of the VCO 110, i.e., the multiphase VCO clocks 122, is then buffered by output clock buffers 118 prior to output as a plurality of multiphase output signals 120. At the same time, the multiphase VCO clocks 122 are feed back to the PFD 112 via the feedback dividers 114. As is recognized, the VCO 110 can be implemented either as a single-ended or differential VCO.

In order to produce multiphase VCO clocks 122 and, indirectly, the plurality of multiphase output signals 120, the PLL 108 must be in a locked state. A first prior art solution to providing pluralities of multiphase output signals at two or more frequencies is to implement the apparatus of FIG. 1, produce a plurality of multiphase output signals at a first frequency, relock the PLL, produce a plurality of multiphase output signals at a second frequency, and repeat if more frequencies are requested. A typical lock time of a PLL is at least 5 micro seconds (e.g., 5 us). However, many of today's interfaces requiring multiphase clocks 106 (such as the HyperTransport® microprocessor interface) require frequency transitions within an adjacent reference clock period (e.g., 1 us) for proper operation. Therefore, this first solution is inherently problematic. That is, a PLL 108 must be able to produce a plurality of multiphase output signals at a first frequency, relock at a second frequency and produce a plurality of multiphase output signals at a second frequency within a short amount of time for normal operation of the interface 106. As a result, a need exists to provide pluralities of multiphase output signals at different frequencies, i.e., multiphase clocks, in a short amount of time.

A second prior art solution that addresses the need to provide pluralities of multiphase output signals at different frequencies in a short amount of time is generally shown in FIG. 2. The solution requires two multiphase clock generators 104 and 202 each utilizing a PLL 108 to respectively generate a plurality of multiphase output signals at "A" MHz 120 and another plurality of multiphase output signals at "B" MHz 206. A selection stage, such as a multiplexer 204, is provided to receive both pluralities of multiphase outputs signals at "A" and "B" MHz 120 and 260 and selectively output desired signals 209 based upon a multiplexer control signal 208. While this solution is capable of, among other things, providing both pluralities of multiphase output signals 120 and 206 to an interface requiring multiphase clocks within an adjacent reference clock period, it is largely impractical. The power consumed and the area required within a computer system to implement two multiphase clock generators such as 104 and 202 can make this solution cost-ineffective.

A third prior art solution supplying discrete wide-range frequencies (i.e., a multiphase clock having a desired frequency and a desired difference) requires an oscillator, a first selecting means and a frequency dividing means. The oscillator generates a first multiphase clock having a predetermined frequency and having a number of clock signals each shifted in phase by a first phase difference value. The first selecting means receives the first multiphase clock and outputs a second multiphase clock including the same or a different number of clock signals each shifted in phase by a second phase difference value. The second phase difference is n times as long as the first phase difference, where n is an integer. Lastly, the frequency dividing means receives the second multiphase clock and divides the frequency of the second multiphase clock by a predetermined number and outputs a group of clock signals as a third multiphase clock. The third multiphase clock has a frequency determined by the frequency dividing means and a phase difference among the signals equal to that of the second multiphase clock output from the first selecting means.

This prior art solution can inherently suffer from additional serial or cascaded components during the clock output path. Among other things, this approach requires a first selection means to receive a first multiphase clock and output a second output clock having the same or different number of clock signals with a second phase difference prior to frequency division. As a result, the solution can suffer from unnecessary system components and potentially unwanted jitter.

Therefore, a need exists to generate multiphase output signals at different frequencies, i.e., multiphase clocks, in a short amount of time (e.g., within an adjacent reference clock period) while keeping power consumption and circuit area to a minimum. A further need exists to generate multiphase output signals at different frequencies while reducing unnecessary circuit redundancy and jitter common in many multiphase clock generators and frequency dividers.

DETAILED DESCRIPTION OF THE DRAWINGS

The invention will be more readily understood in view of the following description when accompanied by the below figures and wherein like reference numerals represent like elements:

DETAILED DESCRIPTION OF THE PREFERRED EMBODIMENT

Generally, the disclosed multiphase clock generating circuit includes a multiphase clock generator that produces a plurality of multiphase output signals at a first frequency, and a multiphase divider with delayed reset control. The multiphase divider with delayed reset control is operatively coupled to receive the plurality of multiphase output signals at the first frequency and operative to produce a plurality of multiphase output signals at a second frequency based on reset control information.

In another embodiment, the multiphase divider with delayed reset control may include a reset delay circuit and a plurality of divider circuits wherein the reset delay circuit receives the input clock and the reset control information and produces at least one delayed reset signal. In one embodiment, the at least one delayed reset signal is time-shifted reset control information. Based upon the input clock and the at least one delayed reset signal, each of the plurality of divider circuits produces a respective one of the plurality of multiphase output signals at the second frequency. In one embodiment, each of the plurality of multiphase output signals at the second frequency represents a time-shifted, frequency-divided form of the input clock.

In another embodiment, the multiphase divider with delayed reset control may include a plurality of reset delay circuits and a plurality of divider circuits wherein each of the plurality of reset delay circuits receives the input clock and the reset control information and produces a delayed reset signal.

In another embodiment, the multiphase clock generating circuit may be implemented within a bridge circuit such as a northbridge circuit or other memory circuit operatively coupleable to a memory and a host processor wherein the host processor receives a selected plurality of multiphase output signals at a desired frequency.

Figure 1:
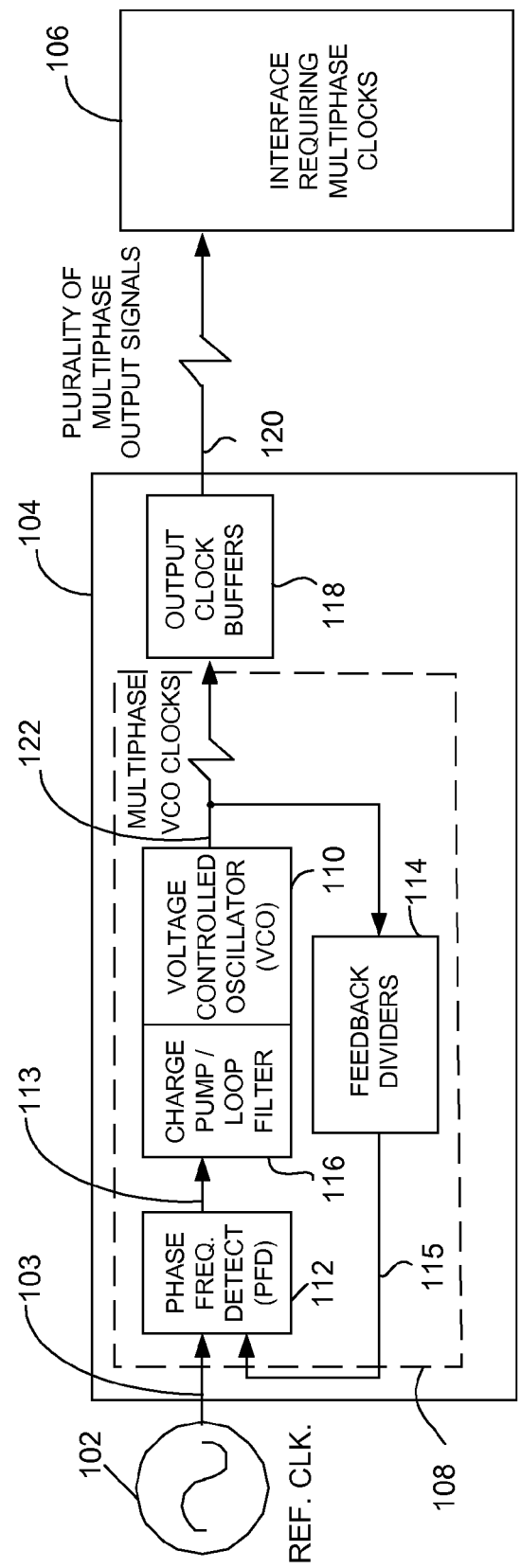
FIG. 1 is a block diagram generally depicting a prior art system for generating a plurality of multiphase output signals for use with an interface requiring multiphase clocks.
Figure 2:
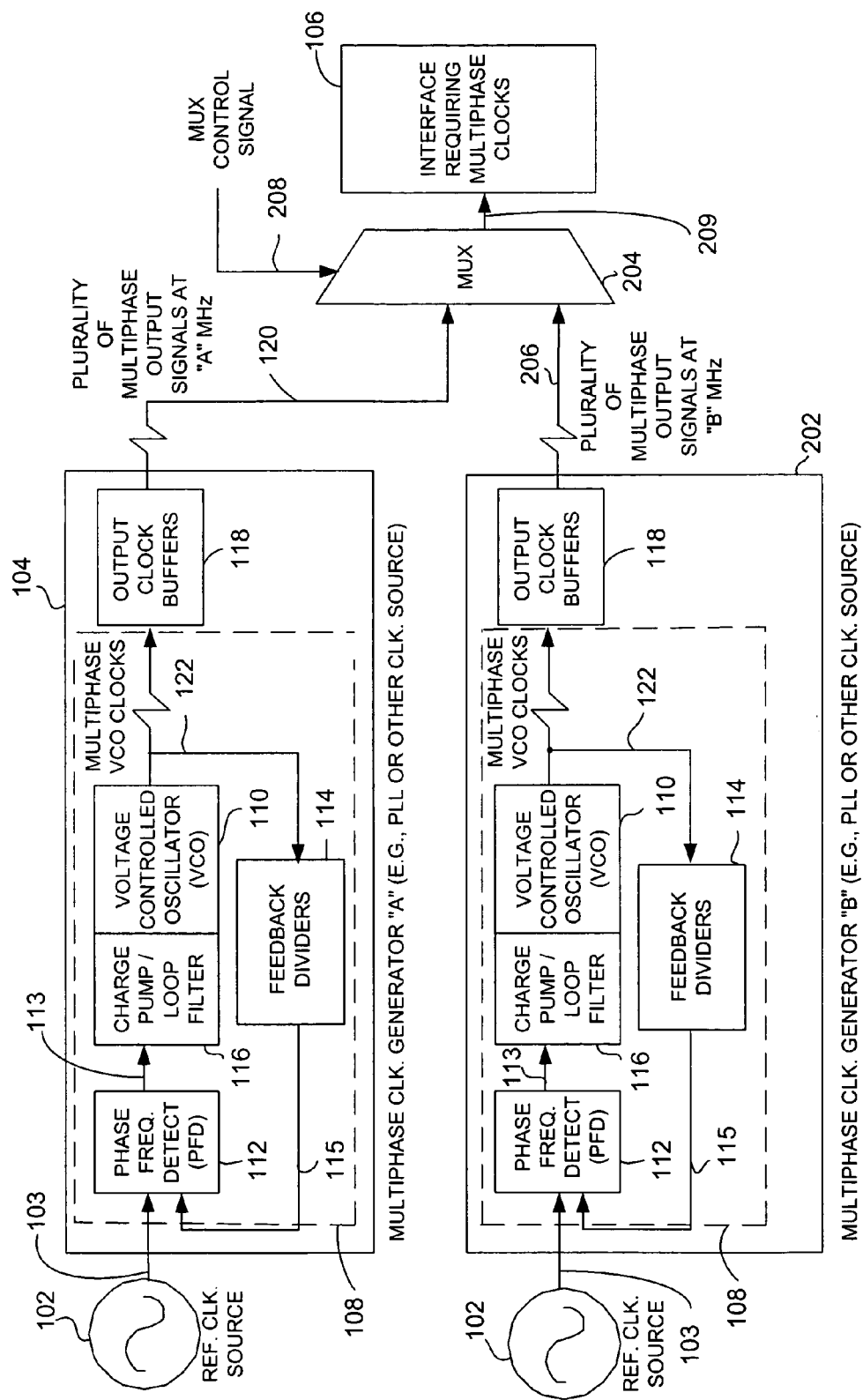
FIG. 2 is a block diagram generally depicting a prior art system for generating two pluralities of multiphase output signals at different frequencies for use with an interface requiring multiphase clocks.
Figure 3:
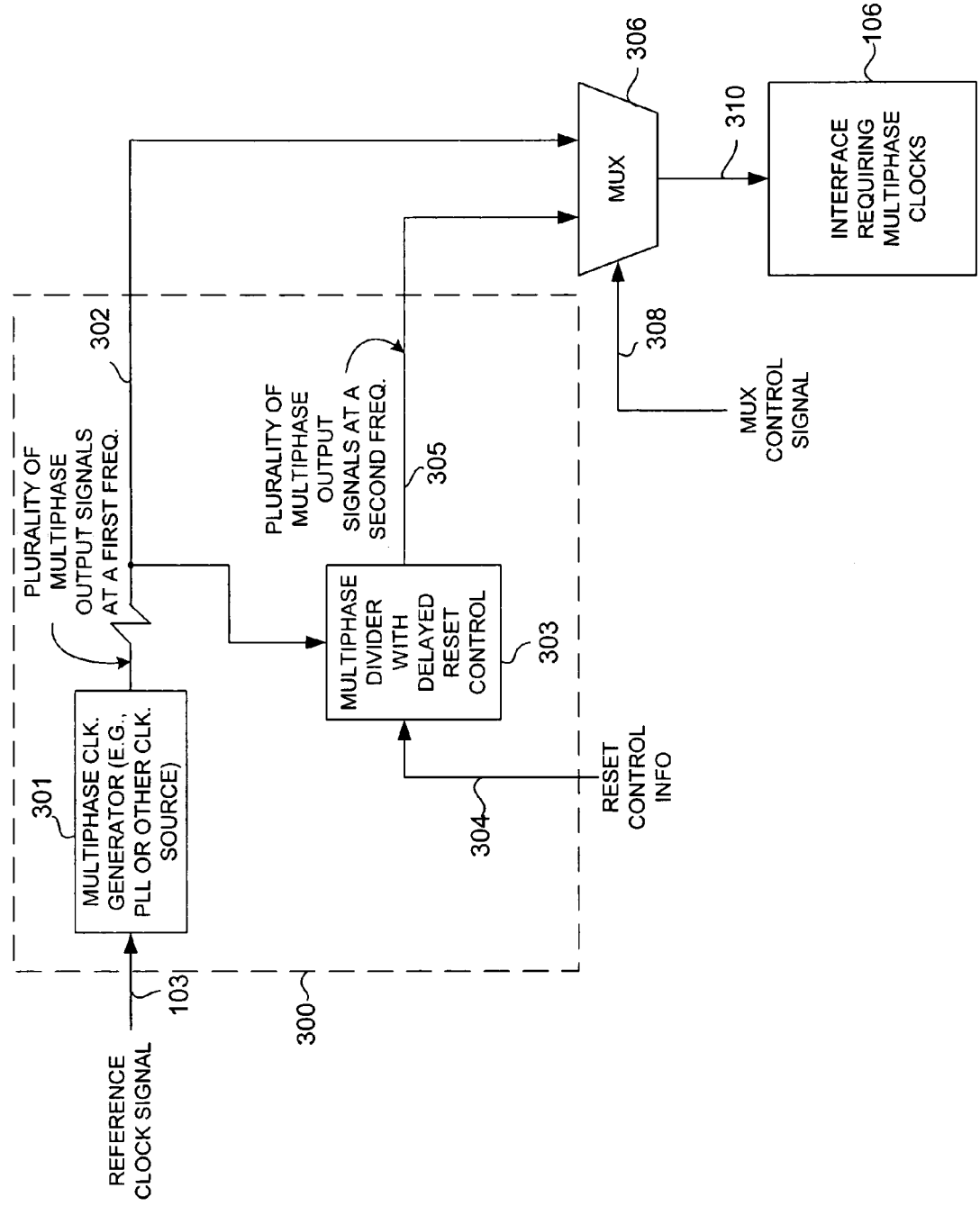
FIG. 3 is a block diagram generally depicting one example of a multiphase clock generating circuit incorporating a multiphase clock generator and a multiphase divider in accordance with one embodiment of the invention

FIG. 3 shows a multiphase clock generating circuit 300 generally adaptable to a computer interface (i.e., interface 106) requiring a transition from multiphase output signals at a first frequency to similar signals at a second frequency in a short amount of time. The multiphase clock generating circuit 300 includes a multiphase clock generator 301 such as a PLL or other clock source that accepts a reference clock signal 103 and produces a plurality of multiphase output signal at a first frequency 302. A multiphase divider with delayed reset control 303 receives the plurality of multiphase output signals at a first frequency 302 in addition to the reset control information 304 and produces a plurality of multiphase output signals at a second frequency 305. A selection means, such as a multiplexer 306, receives both pluralities of multiphase output signals at the first and second frequencies, respectively 302 and 305, and outputs selected signals 310 based upon a multiplexer control signal 308. An interface requiring multiphase clocks 106, such as the HyperTransport® interface used in many microprocessors or any other suitable interface, receives the selected signals 310 from multiplexer 306.

As noted above, the reference clock signal 103 may be provided by a host processor or other source. Similarly, the reset control information 304 may be provided by a host processor as an initialization signal. Alternatively, the reset control information 304 may be provided from an external source and may further be synchronous or asynchronous. In one embodiment, the falling edge of the reset control information 304, i.e., the transition from a logic "1" to a logic "0," may serve to initialize the multiphase divider with delayed reset control 303. The multiplexer control signal 308 may be any signal capable of selecting one or more of the input signals as output to the interface requiring multiphase clocks 106. In a preferred embodiment, however, the multiplexer control signal 308 is determined based upon a predetermined processor boot command so as to allow the selection of either the plurality of multiphase output signals at the first or second frequencies, respectively 302 and 305. In this manner, a microprocessor interface 106 requiring multiphase clocks at a low frequency during a boot-up initialization can quickly transition to operate at a high frequency within a short period of time.

It will be recognized that the multiphase clock generating circuit 300 may be modified to produce multiple pluralities of multiphase output signals at different frequencies by employing additional multiphase dividers with delayed reset control 303. For example, in order to produce (X) pluralities of multiphase output signals each at a unique frequency, (X-1) multiphase dividers with delayed reset control 303 are required, where each multiphase divider with delayed reset control 303 is capable of dividing by a pre-determined value, rational or irrational.

Figure 4:
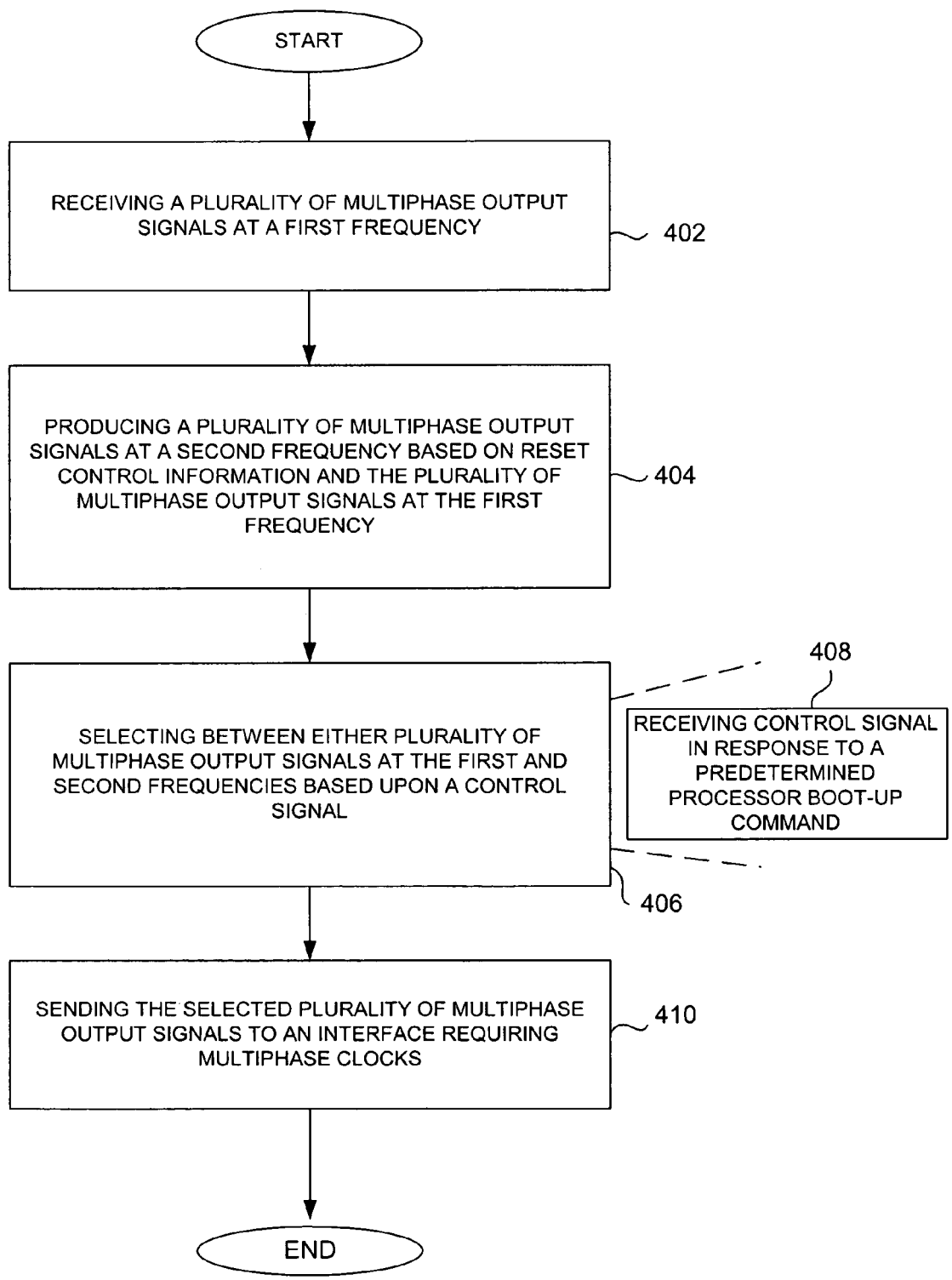
FIG. 4 is a flow chart illustrating a method for generating multiphase clocks in accordance with one embodiment of the invention.

FIG. 4 illustrates a flow chart generally describing one example of a method for generating multiphase clocks in accordance with one embodiment of the invention. The process starts by first receiving a plurality of multiphase output signals at a first frequency, block 402. In one example, this may be done by the multiphase divider with delayed reset control 303 accepting the plurality of multiphase output signals at the first frequency 302 from the multiphase clock generator 301 or other suitable source. In accordance with block 404, the process continues by producing a plurality of multiphase output signals at a second frequency based on reset control information and the plurality of multiphase output signals at the first frequency. By way of example, this may be performed by the multiphase divider with delayed reset control 303. The method generally continues by selecting between either plurality of multiphase output signals at the first and second frequencies based upon a control signal, block 406. A selector means, such as multiplexer 306, may be utilized in one example to select among the pluralities of multiphase output signals at the first and second frequencies, respectively 302 and 305. In a preferred embodiment, the process of block 406 includes receiving the control signal in response to a predetermined processor boot-up command, block 408. By way of example, a multiplexer control signal 308, acting in response to a processor boot-up command, may be received by multiplexer 306 to select an output 310. Lastly, in block 410, the process concludes by sending the selected plurality of multiphase output signals to an interface requiring multiphase clocks. This may be done by the multiplexer 306 sending selected signals 310 to an interface requiring multiphase clock 106.

Figure 5:
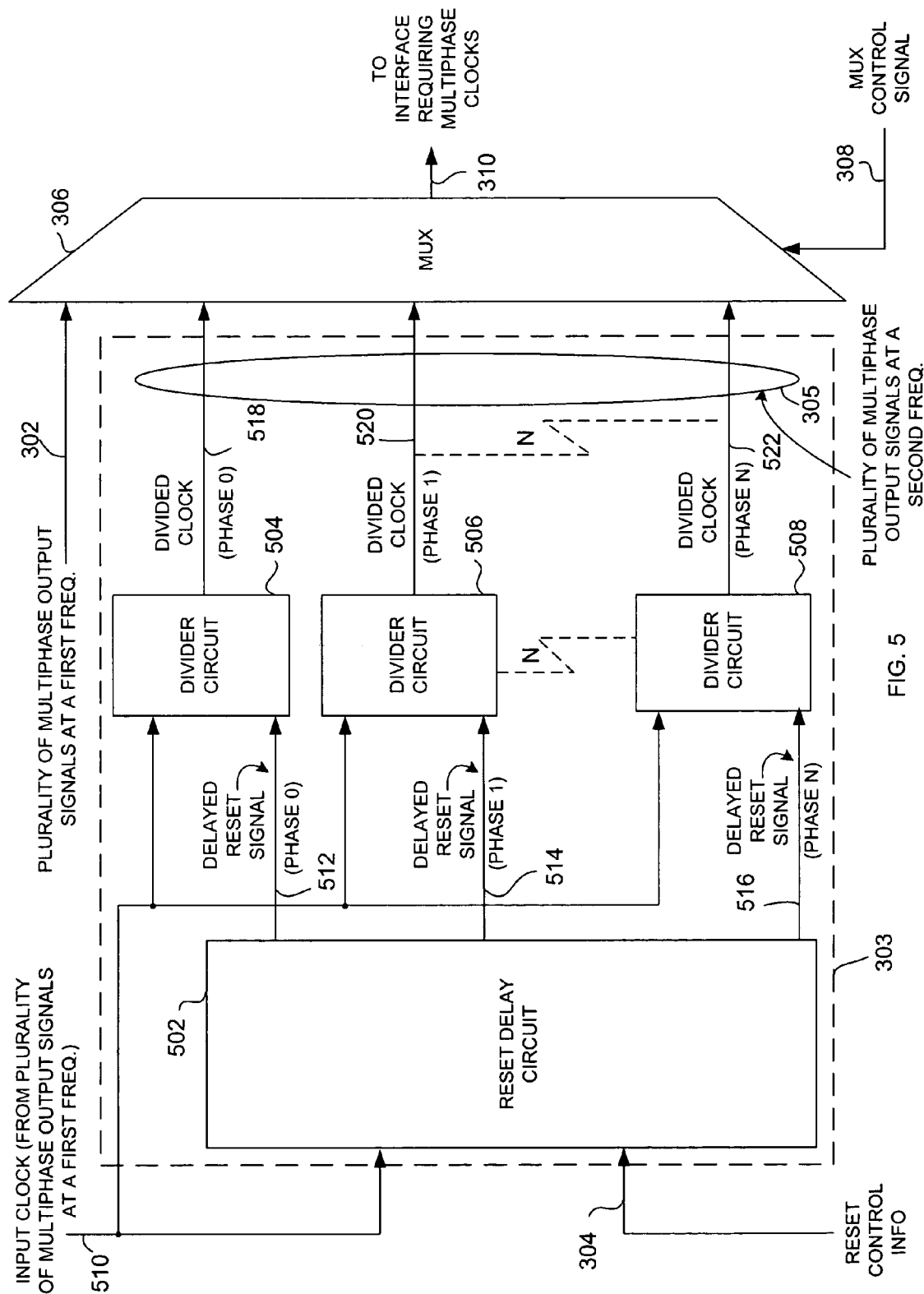
FIG. 5 is a block diagram generally depicting in more detail one embodiment of a multiphase divider, as illustrated in FIG. 3, further incorporating a divider reset delay circuit and a plurality of divider circuits.

FIG. 5 shows one embodiment of the multiphase divider with delayed reset control 303 in accordance with FIG. 3. The multiphase divider with delayed reset control 303 includes a reset delay circuit 502 capable of, among other things, receiving an input clock 510 and reset control information 304 and producing at least one delayed reset signal 512–516. Each delayed reset signal 512–516 represents a phase-delayed version of the reset control information 304. Preferably, the phase of each delayed reset signal 512–516 corresponds to a phase of one of the plurality of multiple output signals at a first frequency 302. Coupled to the reset delay circuit 502 is a plurality of divider circuits 504–508, each of which receives the input clock 510 in addition to a respective one of the at least one delayed reset signal 512–516 and produces one of the divided clocks 518–522. Preferably, each divided clock 518–522 represents a phase-shifted, frequency-divided version of the input clock 510. In other words, each divider circuit 504–508 divides the frequency of the input clock 510 by a particular value and time-shifts the output by an amount corresponding to the phase of the divider circuit's associated delayed reset signal 518–522. Together, the collective output of the divider circuits 504–508 constitute the plurality of multiphase output signals at a second frequency 305. It is further recognized that the number of divider circuits within the plurality of divider circuits 504–508 generally corresponds to the number of delayed reset control signals 512–516 produced by the reset delay circuit 502.

As previously explained and further illustrated in FIG. 5, the multiplexer 306 is capable of receiving both the plurality of multiphase output signals at a first frequency 302 and the plurality of multiphase output signals at the second frequency 305. By way of a multiplexer control signal 308, the multiplexer 306 is capable of sending selected signals 310 to an interface requiring multiphase clocks 106.

The input clock 510, supplied to the reset delay circuit 502 and to each of the plurality of divider circuits 504–508, is preferably a signal from the plurality of multiphase output signals at the first frequency 302. In this manner, the plurality of multiphase output signals at a second frequency 305 is created from the input clock 510 (i.e., one of the plurality of multiphase output signals at a first frequency 302) and reset control information 304.

Figure 6:
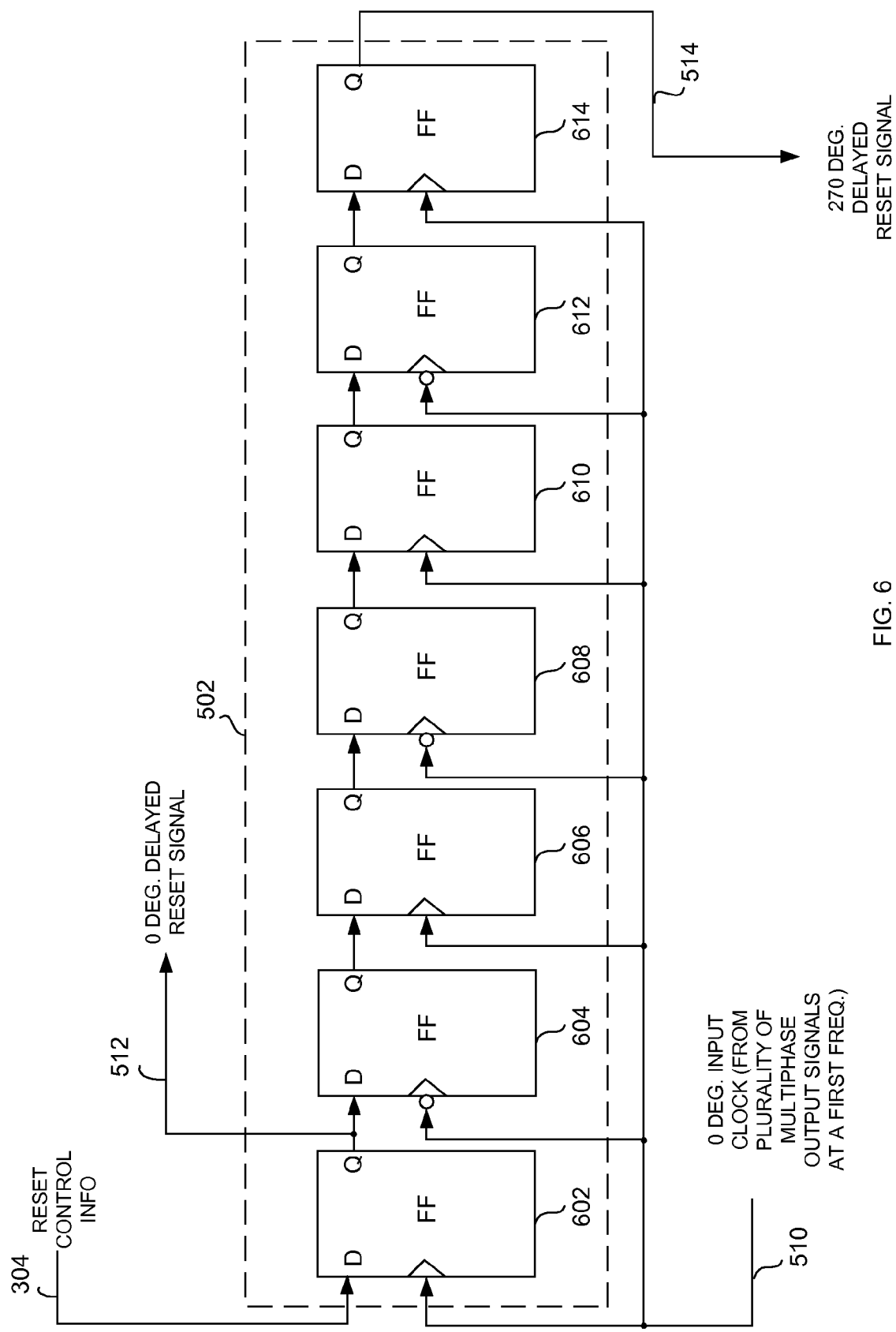
FIG. 6 is a block diagram depicting, by way of example, one embodiment of a divider reset delay circuit, capable of producing a 0 degree delayed reset signal and a 270 degree delayed reset signal for implementation with a divider circuit capable of dividing the input frequency by four, in accordance with FIG. 5.

FIG. 6 shows, by way of example, a divide-by-four reset delay circuit 502 as used by a multiphase clock generating circuit 300 employing a 0 degree input clock 510 and having an interface 106 requiring 0 degree and 270 degree (i.e., multiphase) signals at a first frequency "A" and at a second frequency "A/4." In other words, FIG. 6 illustrates a divide-by-four reset delay circuit 502. As previously described, the reset delay circuit 502 receives the reset control information 304 and the input clock 510 and outputs at least one delayed reset signal 512–516. In this example, the output is a 0 degree delayed reset signal 512 and a 270 degree delayed reset signal 514.

Preferably, the reset delay circuit 502 includes a shift register such as the one illustrated in FIG. 6 including a plurality of flip-flop circuits 602–614 operatively coupled together in a series configuration. Referencing the specific structure implemented by FIG. 6, the shift register accepts the reset control information 304 as input D of flip-flop 602. The output Q of each flip-flop 602–614 becomes the input D of the next flip-flop in the series. Lastly, the input clock 510 is provided to each flip-flop 602–614 in the shift register to serve as a trigger mechanism for the latching of input data at each input D.

By implementing the series configuration illustrated in FIG. 6, various output Q nodes can be "tapped" to produce a desired delayed reset signal. Because the flip-flop circuits 602–614 are illustrated with an inherent gate delay of 45 degrees relative to the divided clock, the output Q of the first flip-flop 602 corresponds to a 0 degree delayed reset signal. Similarly, the output Q of the seventh flip-flop 614 corresponds to the 270 degree delayed reset signal.

However, it is also recognized that any suitable number of flip-flops having various inherent delays associated therewith can be coupled together in a similar manner to produce any conceivable delay necessary by the system. Additionally, while the preferred reset delay circuit 502 has been described with reference to a shift register, any logic delay element or elements may be used to create a delayed reset signal. In the one embodiment, the logic elements contained within the reset delay circuit 502 are implemented using CMOS or any other suitable logic-implementation technique. Additionally, any suitable hardware such as, but not limited to, programmable and non-programmable hardware, or software executed by a processor may be also be utilized. Furthermore, while a 0 degree input clock 510 was utilized in the example illustrated in FIG. 6, it is recognized that any signal from the plurality of output signals at the first frequency 302 or any other suitable signal may be substituted in its place to similarly drive the reset delay circuit 502 and its associated logic elements.

Figure 7:
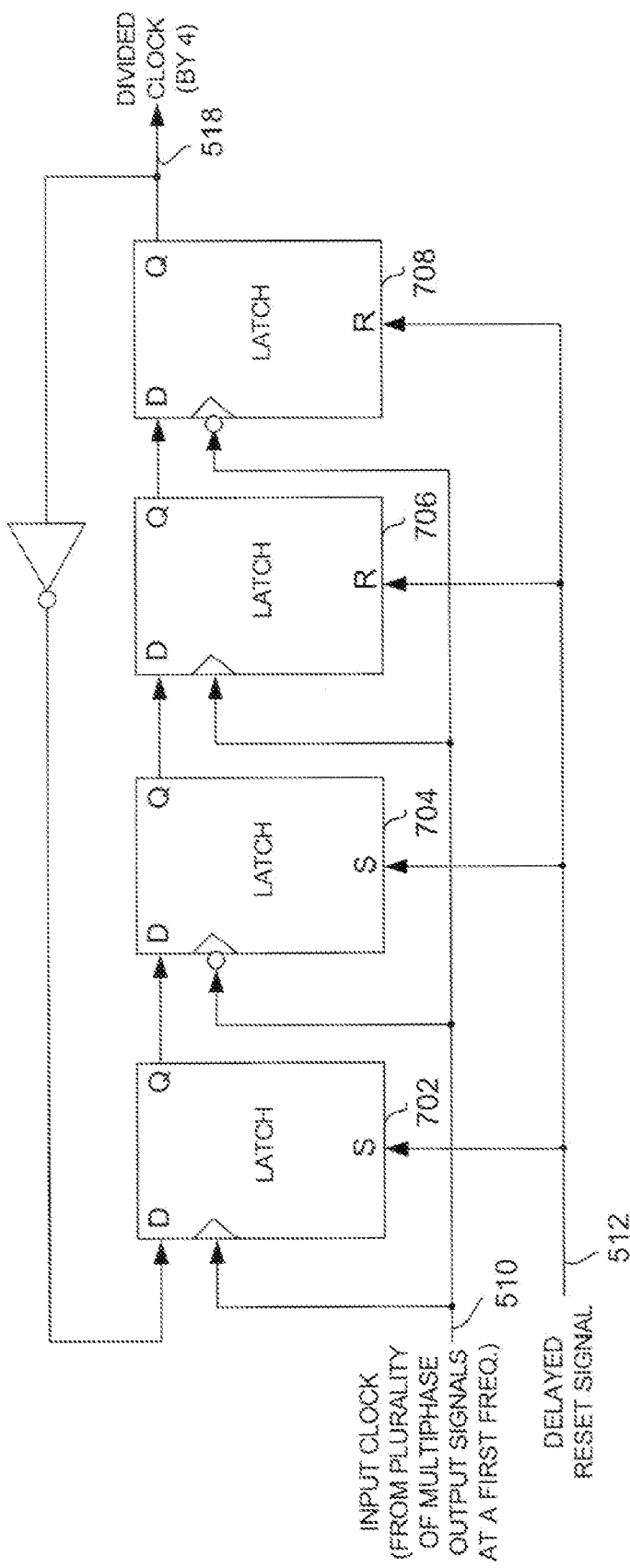
FIG. 7 is a block diagram depicting, by way of example, one embodiment of a divider circuit, capable of dividing the input frequency by four, in accordance with FIG. 5.

FIG. 7 shows, also by way of example, one of the plurality of divider circuits 504–508 capable of, among other things, dividing an input signal's frequency by four. It will be recognized that such a divider may be termed a "divider by four." The divider by four includes four latches 702–708 connected in series with the output Q of latch 708 providing feedback to latch 702 (i.e., serving as input D for latch 702). In addition, each latch 702–708 within the divider by four receives a common delayed reset signal 512 from the reset delay circuit 502 and an input clock 510 preferably from the plurality of multiplexer output signals at a first frequency 302. When the delayed reset signal 512 is high (i.e., a logical "1"), latches 702 and 704 are "set" to produce a high output. Similarly, when the delayed reset signal is low (i.e., a logical "0"), latches 706 and 708 are "reset" to produce a low output. As a result of this architecture, the divided clock 518 represents a phase-shifted, frequency-divided (by four) version of this input clock 510.

Figure 8:
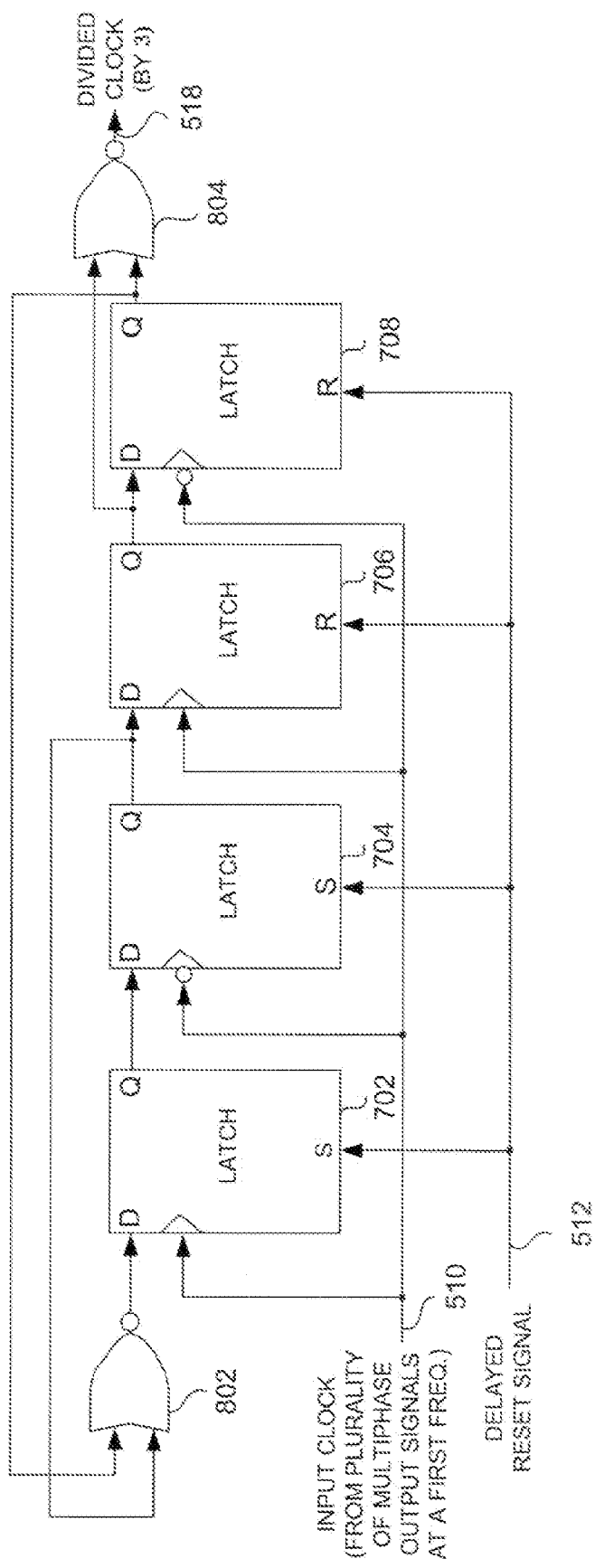
FIG. 8 is a block diagram depicting, by way of example, another embodiment of a divider circuit, capable of dividing the input frequency by three, in accordance with FIG. 5.

Similarly, FIG. 8 also shows by way of example, another of the plurality of divider circuits 504–508 capable of, among other things, dividing an input signal's frequency by three. It will be recognized that such a divider may be termed a "divider by three." It is further noted that the structure of the divider by three illustrated in FIG. 7 is substantially similar to the structure of the divider by four in FIG. 7 with additional NOR gates 802 and 804 and their corresponding inputs and outputs. As a result of this architecture the divided clock 518 represents a phase-shifted, frequency-divided (by three) version of the input clock 510.

The divider circuits illustrated in FIGS. 7 and 8 may be recognized as "Johnson dividers." It is also recognized that each of the plurality of divider circuits 504–508 may be implemented to modify the frequency of the input clock 510 by either rational and irrational values using the same or a similar architecture as illustrated in FIGS. 7 and 8. In this manner, any required frequency can be produced. Similar to the logic shift register explained in reference to FIG. 6 and the reset delay circuit 502, the logic elements contained within the plurality of divider circuits 504–508 may be implemented using CMOS or any other suitable logic-implementation technique. Additionally, any suitable hardware such as, but not limited to, programmable and non-programmable hardware, or software executed by a processor may be also be utilized.

In this manner, multiphase output signals at different frequencies, i.e., multiphase clocks, are generated in a short amount of time while keeping power consumption and circuit area to a minimum. Instead of driving two multiphase clock generators, the solution presented utilizes a single multiphase clock generator and creates a plurality of multiphase output signals at a second frequency based upon a multiphase divider with reset control 302. Additionally, the number of elements within the multiphase clock generator is reduced to decrease jitter and redundancy.

Figure 9:
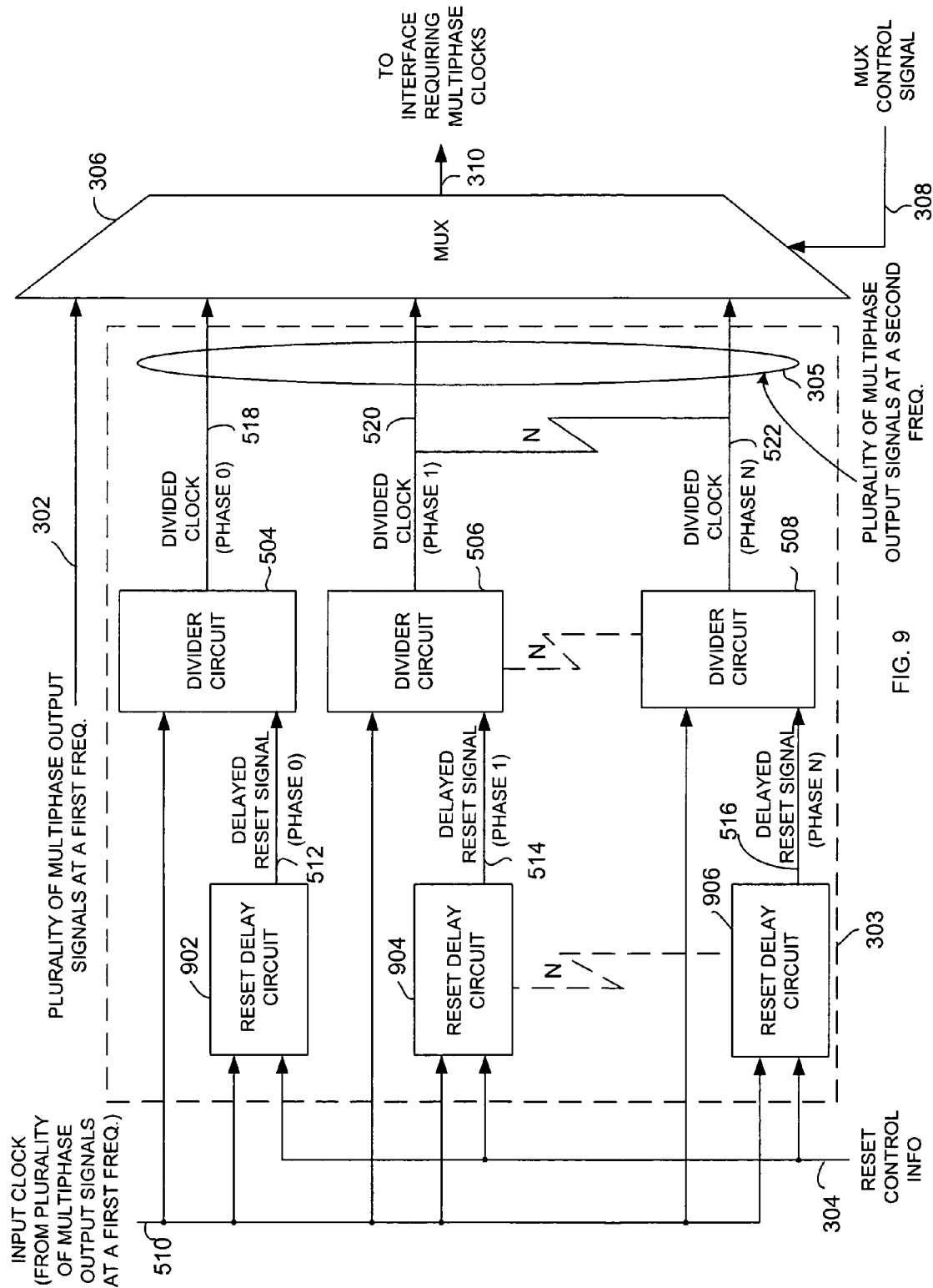
FIG. 9 is a block diagram generally depicting in more detail another embodiment multiphase divider, as illustrated in FIG. 3, further incorporating a plurality of divider reset delay circuits and a plurality of divider circuits.

FIG. 9 illustrates an alternate embodiment of the multiphase divider with delayed reset control 303 in accordance with FIG. 3. In the alternate embodiment, the multiphase divider with delayed reset control 303 includes a plurality of reset delay circuits 902–906, where each is capable of, among other things, receiving an input clock 510 and reset control information 304 and producing a delayed reset signal 512–516. Each delayed reset signal 512–516 represents a phase-delayed version of the reset control information 304. Preferably, the phase of each delayed reset signal 512–516 corresponds to a phase of one of the plurality of multiple output signals at a first frequency 302. Coupled to each of the reset delay circuits 902–906 is a plurality of divider circuits 504–508, each of which receives a respective one of the at least one delayed reset signal 512–516 and the input clock 510 to produce one of the divided clocks 518–522. Preferably, each divided clock 518–522 represents a phase-shifted, frequency-divided version of the input clock 510. In other words, each divider circuit 504–508 divides the frequency of the input clock 510 by a particular value and time-shifts the output by an amount corresponding to the phase of the divider circuit's associated delayed reset signal 512–516. Together, the collective output, e.g., the divided clocks 518–522, of the divider circuits 504–508 constitute the plurality of multiphase output signals at a second frequency 305. It is recognized that the number of divider circuits within the plurality of divider circuits 504–508 generally corresponds to the number of delayed reset control signals 512–516 produced by the reset delay circuits 902–906.

Figure 10:
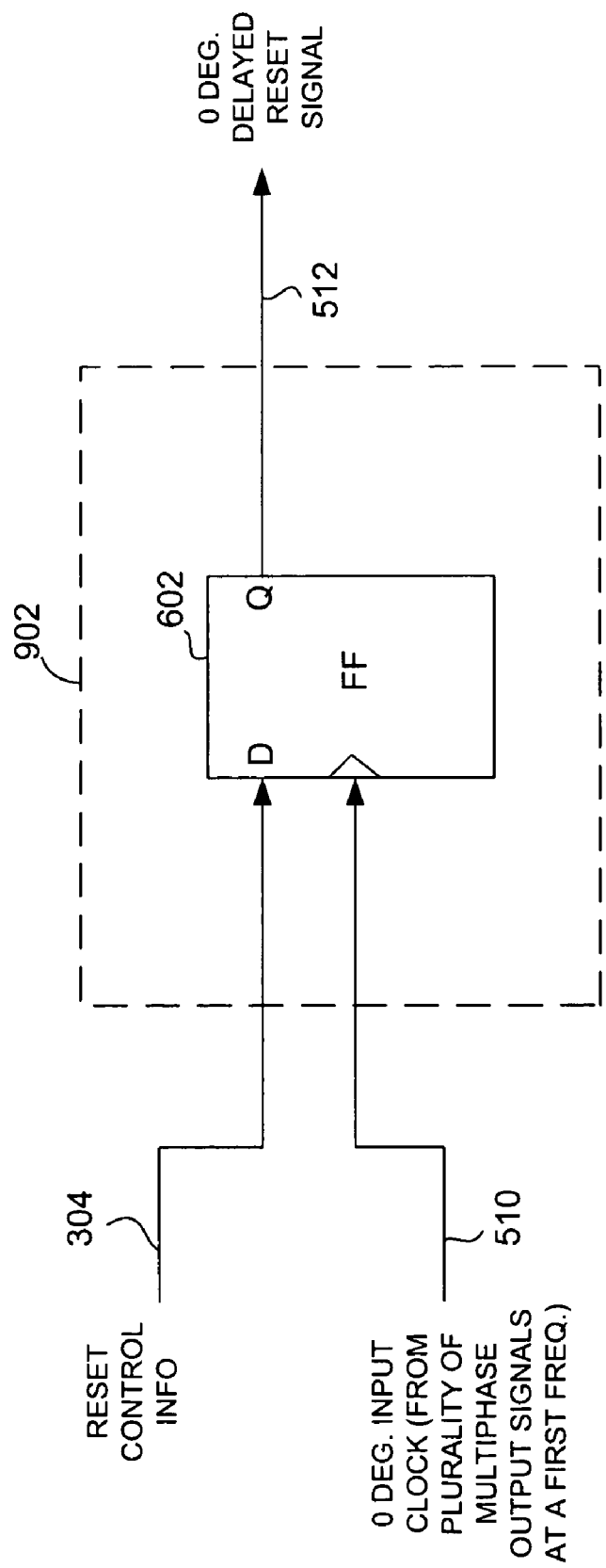
FIG. 10 is a block diagram depicting, by way of example, one embodiment of a reset delay circuit, capable of producing a 0 degree delayed reset signal for implementation with a divider circuit capable of dividing the input frequency by four, in accordance with FIG. 9.
Figure 11:
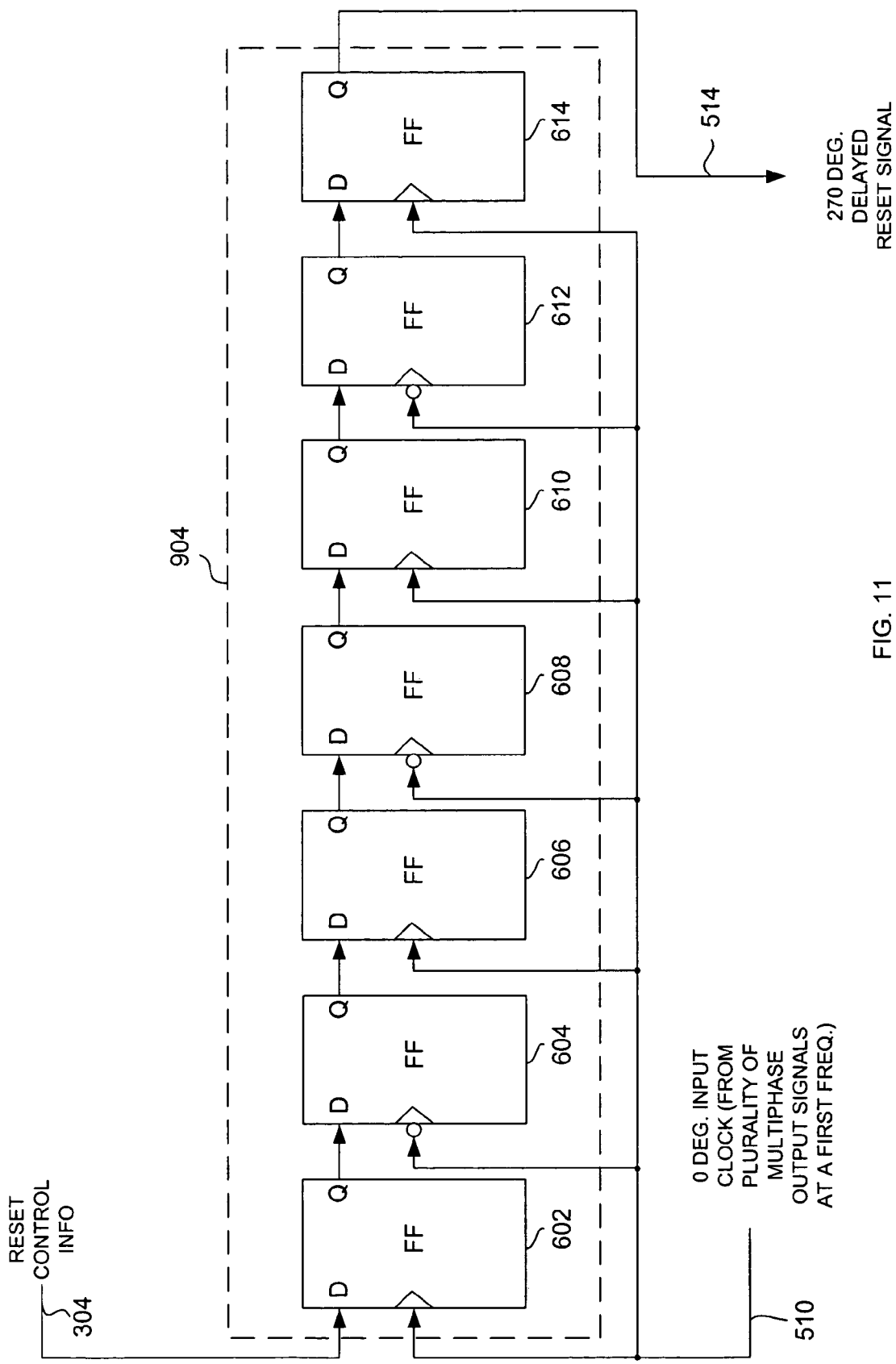
FIG. 11 is a block diagram depicting, by way of example, another embodiment of a reset delay circuit, capable of producing a 270 degree delayed reset signal for implementation with a divider circuit capable of dividing the input frequency by four, in accordance with FIG. 9.

Together, FIGS. 10 and 11 show, by way of example, divide-by-four reset delay circuits 902 and 904, respectively, as used in a multiphase clock generating circuit 300 utilizing a 0 degree input clock 510 and having an interface 106 requiring a 0 degree and 270 degree (i.e., multiphase) signals at two distinct frequencies "A" and "A/4." The result of the two reset delay circuits 902 and 904 is identical to the delayed reset signals output from the divide-by-four reset delay block 502 as illustrated in FIG. 6. In FIG. 10, reset delay circuit 902 produces a 0 degree delayed reset signal 512 using a single flip-flop circuit 602. Similarly, in FIG. 10, reset delay circuit 904 produces a 270 degree delayed reset signal 514 using an identical series of flip-flop circuits 602–614 as illustrated in FIG. 6.

As stated with respect to FIG. 6, it will also be recognized that any suitable number of flip-flops having various inherent delays associated therewith can be coupled together in series to produce any conceivable delay necessary by the system. Additionally, while the preferred plurality of reset delay circuits 902–906 include shift registers, any logic delay element or elements may be used to create a delayed reset signal. In one embodiment, the logic elements are implemented using CMOS. However, it is recognized that other suitable logic-implementation techniques may be used. Additionally, any suitable hardware such as but not limited to programmable and non-programmable hardware, or software executed by a processor may be also be utilized.

Figure 12:
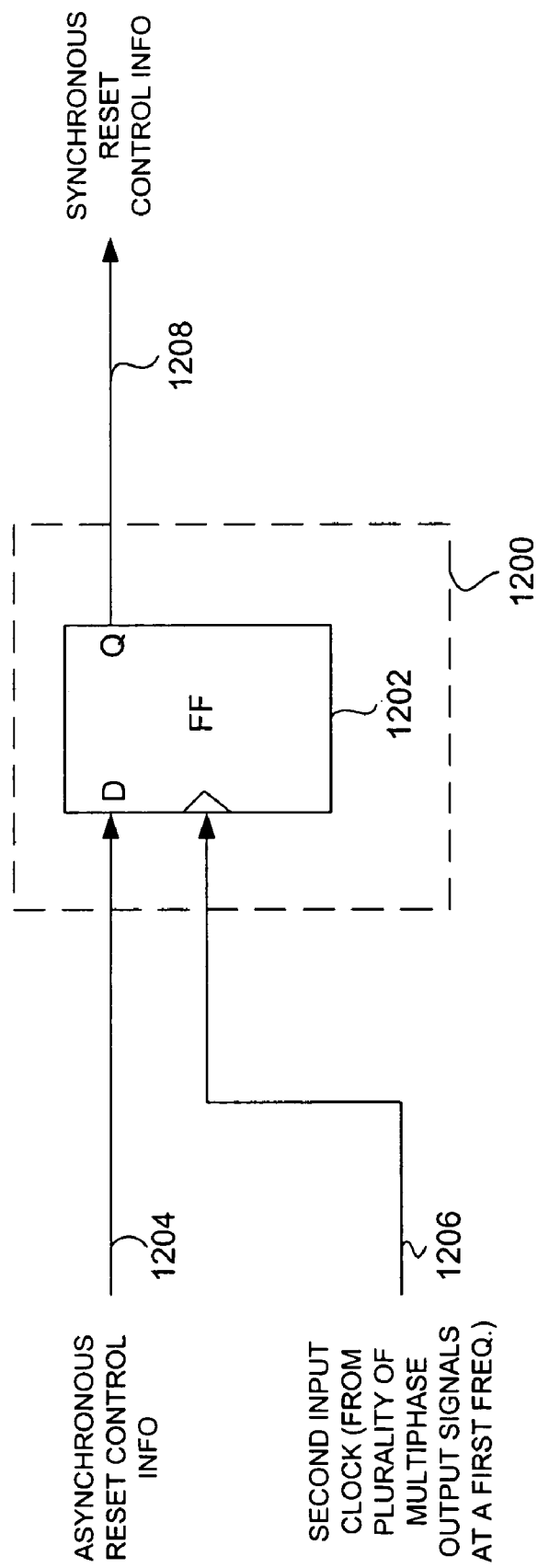
FIG. 12 is a block diagram depicting, by way of example, one embodiment of a synchronization block utilizing a D-type flip-flop capable of using a second input clock to synchronize asynchronous reset control information.

The above FIGS. have been described with reference to reset control information 304 as supplied by a host processor executing instructions from system memory or from a suitable external source. As described above, the reset control information 304 serves as an initialization signal where, in one embodiment, the transition from a logic "1" to a logic "0" serves to initialize the multiphase divider with delayed reset control 303. However, the reset control information 304 may be synchronous or asynchronous information. Therefore, to prevent a metastable condition from occurring within the reset delay circuit 502 or within the plurality of reset delay circuits 902–906, a synchronization circuit 1200 as illustrated in FIG. 12 may be used to synchronize asynchronous reset control information 1204. As shown, the synchronization block is preferably a flip-flop circuit 1202 capable of accepting asynchronous reset control information 1204 and a second input clock 1206 as input and producing synchronous reset control information 1208. The second input clock 1206 is preferably a signal from the plurality of multiphase output signals at a first frequency 302 with a different frequency than the input clock signal 510 described above. However, it is recognized that the second input clock 1206 may be any signal having the same frequency but a different phase than the input clock 510.

To avoid metastability, when asynchronous reset control information 1204 is provided to the multiphase divider with delayed reset control 303, it must be synchronized prior to being input to the reset delay circuit 502 or the plurality of reset delay circuits 902–906. As such, the synchronization circuit 1200 may be implemented outside of the multiphase divider with delayed reset control 304. However, it is also recognized that the synchronization circuit 1200 may be placed within the reset delay circuit 502 and each of the plurality of reset delay circuits 902–906 to accomplish the same result (i.e., to avoid metastability).

In one embodiment, the logic elements and their equivalents contained within the synchronization circuit 1200 as illustrated in FIG. 12 are implemented using CMOS. However, other suitable logic-implementation techniques can also be used. Additionally, any suitable hardware such as but not limited to programmable and non-programmable hardware, or software executed by a processor may be also be utilized.

Figure 13:
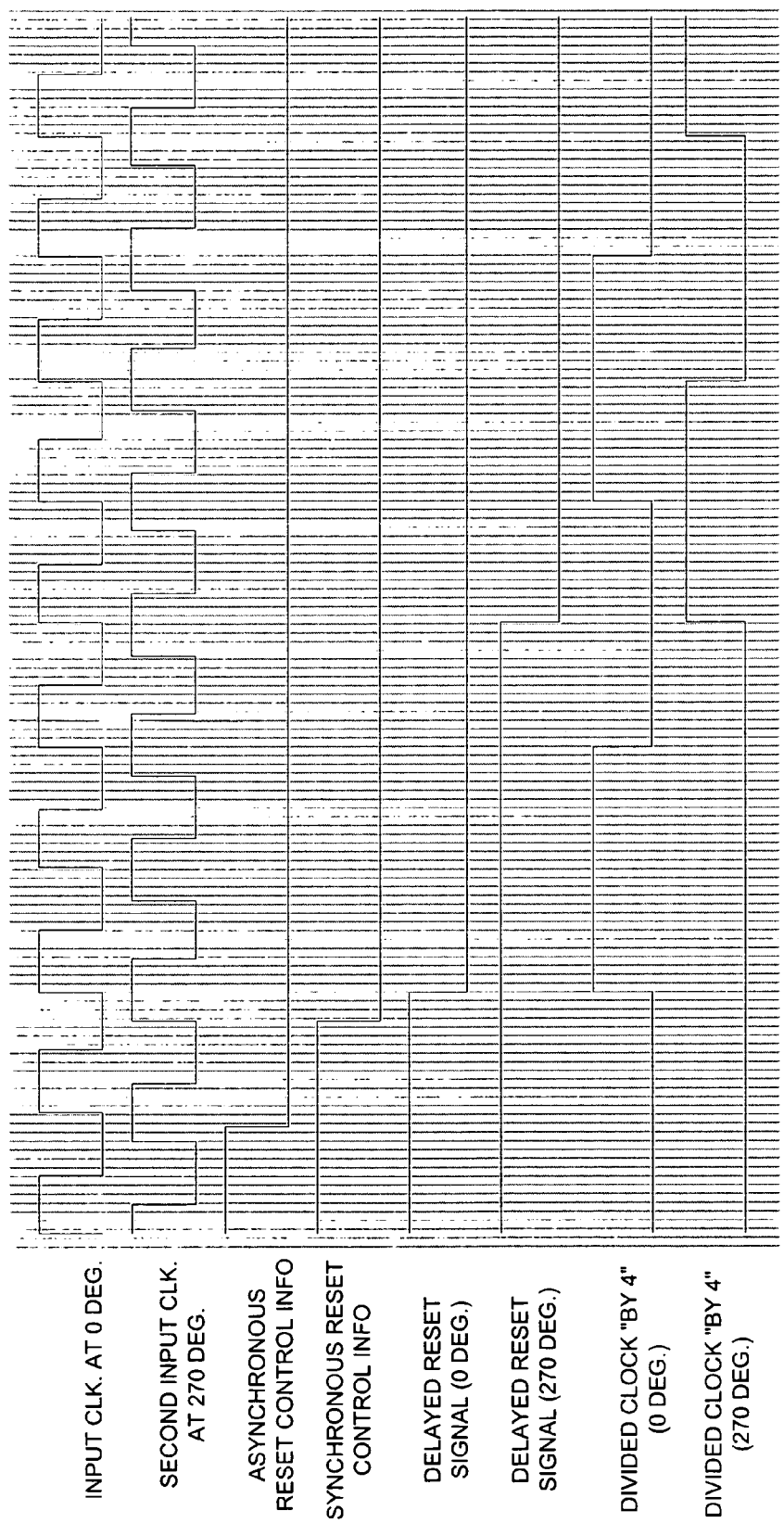
FIG. 13 is a timing diagram generally illustrating, by way of example, the temporal relationship between signals operating within the multiphase clock generating circuit having a 0 degree input clock, a 270 degree second input clock and having an interface requiring 0 degree and 270 degree output signals at two distinct frequencies.

FIG. 13 shows a timing diagram illustrative of the temporal relationship between various signals operating within the exemplary multiphase clock generating circuit utilizing a 0 degree input clock and having an interface 106 requiring 0 degree and 270 degree (i.e., multiphase) signals at two distinct frequencies (i.e., frequency "A" and frequency "A/4"). The timing diagram reflects asynchronous reset control information and corresponding synchronous reset control information as driven by a 270 degree second input clock from the plurality of multiphase output signals at the first frequency.

Figure 14:
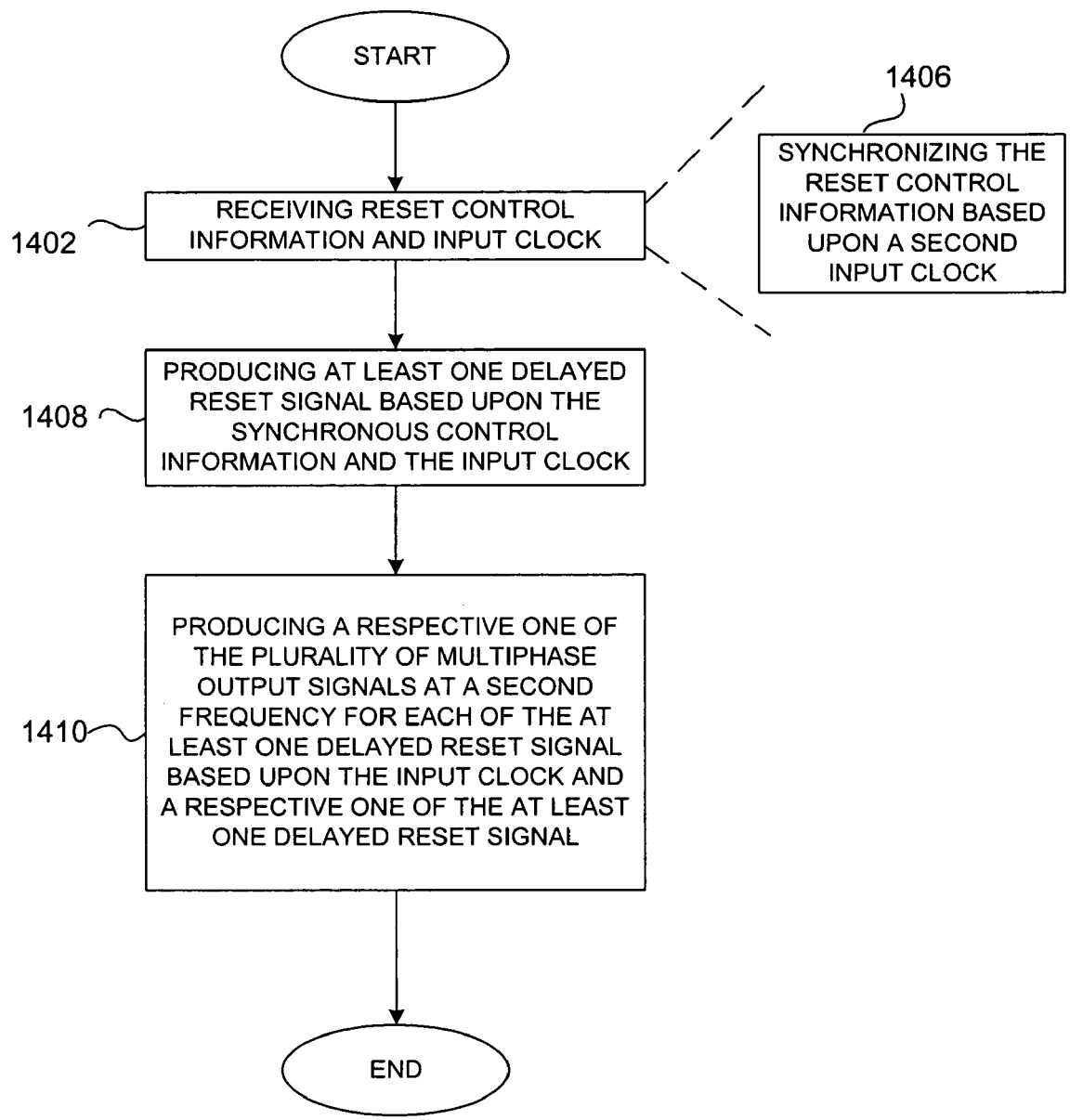
FIG. 14 is a flow chart illustrating one example of a method for generating multiphase clocks in accordance with a second embodiment of the invention.

FIG. 14 is a flow chart generally illustrating another method for generating multiphase clocks. The process begins by receiving reset control information and an input clock, block 1402. By way of example, a reset delay circuit 502 may receive an input clock 510 corresponding to one of the plurality of multiphase output signals at the first frequency 302 from a multiphase clock generator 301. In addition, the reset delay circuit 502 may receive reset control information 304 from a host processor or other suitable source. In one embodiment, the method of receiving reset control information and an input clock includes the process of synchronizing the reset control information based upon a second clock input, block 1406. For instance, reset control information 304 may be an asynchronous data signal. In one embodiment, a synchronization circuit 1200 may be utilized to convert asynchronous reset control information 1204 into synchronous reset control information 1208 based upon a second input clock 1206 having the same frequency but different phase than the input clock 510 and preferably representing one of the plurality of multiphase output signals at a first frequency 302.

The process continues by producing at least one delayed reset signal, block 1408, based upon the synchronous control information and input clock. Also by way of example, the reset delay circuit 302 may be utilized to produce at least one delayed reset signal 512–516. Each of the at least one delayed reset signal 512–516, representing time-shifted, reset control information 304, is produced based upon the reset control information 304 and the input clock 510. Lastly, the process concludes in block 1410 by producing a respective one of the plurality of multiphase output signals at a second frequency for each of the at least one delayed reset signal based upon the input clock and a respective one of the at least one delayed reset signal. For an example, each of the plurality of divider circuits 504–508 may be operatively coupled to receive a respective one of the at least one delayed reset signal 512–516 and the input clock 510 to produce a respective one of the plurality of multiphase output clocks at a second frequency 305. Each of the plurality of multiphase output signals at the second frequency 305 are time-shifted, frequency-divided versions of the input clock 510.

Figure 15:
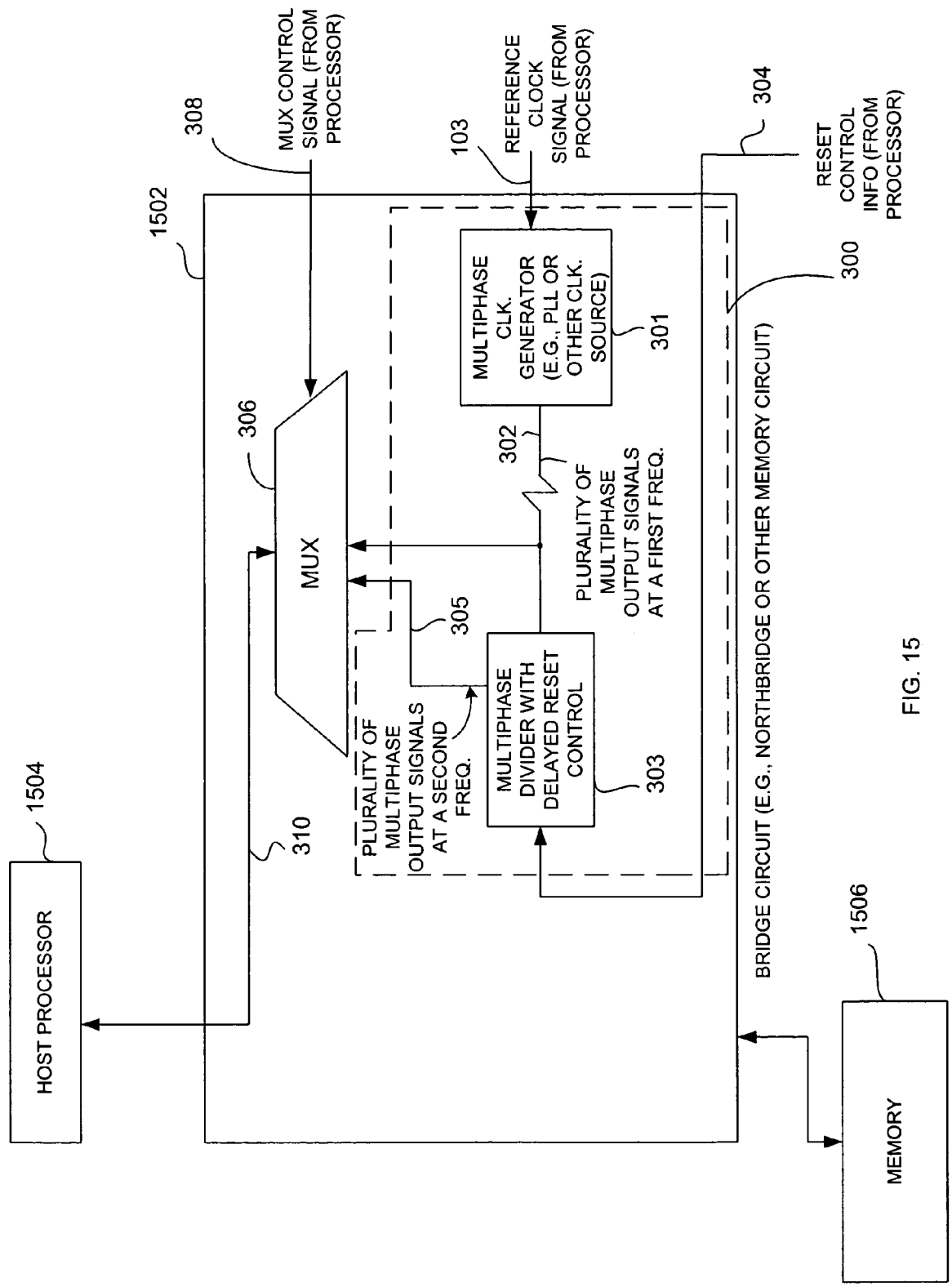
FIG. 15 is a block diagram generally depicting one embodiment of a bridge circuit including a multiphase clock generating circuit in accordance with the invention.

FIG. 15 generally shows one embodiment of a bridge circuit 1502 such as a northbridge circuit or other memory circuit operatively coupled to a host processor 1504 and memory 1506. The memory bridge circuit 1502 includes, among other things, the multiphase clock generating circuit 300 coupled to a selection means such as multiplexer 306. For instance, multiphase clock generator 301, multiphase divider with delayed reset control 303 and multiplexer 306 may all be operatively coupled together as described with reference to FIG. 3 within a bridge circuit 1502. The output of multiplexer 306 is coupled to the host processor 1504 by way of a pair of transceivers (not shown) such that selected signals 310 are received by the host processor 1504 based upon the received multiplexer control signal 308. As indicated in FIG. 15, the reference clock signal 103, reset control information 304 and multiplexer control signal 308 preferably represent data sent from the host processor 1504 upon execution of instructions stored in memory 1506 such as system memory. However, it is recognized that the reference clock signal 103, reset control information 304 and multiplexer control signal 308 may be data from any external source.

As a result of this disclosure, multiphase clocks at different frequencies are generated and provided to an interface to allow on-the-fly "frequency hopping" within a short amount of time, i.e., within an adjacent reference clock period after assertion of the multiplexer control signal. In other words, multiphase clocks at different frequencies are generated and provided to an interface to allow an instantaneous or near-instantaneous jump in frequency within a short amount of time. Furthermore, power consumption and the necessary circuit area are reduced to provide a cost effective solution. Because the number of necessary elements is reduced a delayed reset signals represent phase-shifted reset control information, the redundancy and jitter within the multiphase clock generating circuit is also reduced. Additionally, the present disclosure allows a greater degree of flexibility and speed by not requiring a first selection means separate from a frequency dividing means that receives a first multiphase clock having a number of clock signals and outputs a second multiphase clock having the same or different number of clock signals, each of which is shifted in phase by a predetermined amount as required in one prior art solution.

The above detailed description of the invention and the examples described therein have been presented for the purposes of illustration and description only and not by limitation. Also, the word "coupled" means directly or indirectly coupled to facilitate operation of the circuit. It is therefore contemplated that the present invention cover any and all modifications, variations or equivalents that fall within the spirit and scope of the basic underlying principles disclosed above and claimed herein.

What is claimed is:

1. A multiphase clock generating circuit comprising:
a phase locked loop operative to produce a plurality of multiphase output signals at a first frequency;
a multiphase divider with delayed reset control, operatively coupled to receive the plurality of multiphase output signals at the first frequency, and operative to produce a plurality of multiphase output signals at a second frequency based on reset control information.

2. The multiphase clock generating circuit of claim 1 further comprising a multiplexer operatively coupled to receive the plurality of multiphase output signals at the first frequency and the plurality of multiphase output signals at the second frequency and operative to select between either plurality of multiphase output signals at the first and second frequencies based upon a multiplexer control signal.

3. The multiphase clock generating circuit of claim 2, wherein the multiplexer control signal is operatively responsive to a predetermined processor boot-up command.

4. The multiphase clock generating circuit of claim 1, wherein the reset control information includes synchronous reset data control.

5. A multiphase clock generating circuit comprising:
a multiphase clock generator operative to produce a plurality of multiphase output signals at a first frequency;
a multiphase divider with delayed reset control, operatively coupled to receive the plurality of multiphase output signals at the first frequency, and operative to produce a plurality of multiphase output signals at a second frequency and including a reset delay circuit and a plurality of divider circuits;
the reset delay circuit operatively responsive to reset control information and an input clock to produce at least one delayed reset signal; and
each of the plurality of divider circuits operatively coupled to the reset delay circuit to receive a respective one of the at least one delayed reset signal and is operatively responsive to the input clock to produce a respective one of the plurality of multiphase signals at the second frequency; and
a multiplexer operatively coupled to receive the plurality of multiphase output signals at the first frequency and the plurality of multiphase output signals at the second frequency and operative to select between either plurality of multiphase output signals at the first and second frequencies based upon a multiplexer control signal.

6. The multiphase clock generating circuit of claim 5, wherein the input clock is one of the plurality of multiphase output signals at a first frequency.

7. The multiphase clock generating circuit of claim 5, wherein the multiplexer control signal is operatively responsive to a predetermined processor boot-up command.

8. The multiphase clock generating circuit of claim 5, wherein the multiphase clock generator is a phase locked loop circuit.

9. The multiphase clock generating circuit of claim 5 further including a synchronization circuit operatively responsive to a second input clock and the reset control information to produce synchronous reset control information when the reset control information is asynchronous reset control information.

10. The multiphase clock generating circuit of claim 9, wherein the second input clock is a second one of the plurality of multiphase output signals at a first frequency having a different phase than the input clock.

11. The multiphase clock generating circuit of claim 9, wherein the synchronization circuit is a flip-flop circuit.

12. The multiphase clock generating circuit of claim 9, wherein the synchronization circuit is included within the reset delay circuit.

13. The multiphase clock generating circuit of claim 5, wherein the reset delay circuit includes a shift register, wherein the shift register operatively receives the reset control information as input and is triggered by the input clock to produce the at least one delayed reset signal from at least one of the plurality of flip-flop circuits.

14. The multiphase clock generating circuit of claim 5, wherein each divider circuit is a Johnson divider comprising at least one latch circuit.

15. A multiphase clock generating circuit comprising:
a multiphase clock generator operative to produce a plurality of multiphase output signals at a first frequency;
a multiphase divider with delayed reset control, operatively coupled to receive the plurality of multiphase output signals at the first frequency, and operative to produce a plurality of multiphase output signals at a second frequency and including a plurality of reset delay circuits and a plurality of divider circuits;
each of the plurality of reset delay circuits operatively responsive to reset control information and an input clock to produce a delayed reset signal;
each of the plurality of divider circuits operatively coupled to a respective one of the plurality of reset delay circuits to receive the respective delayed reset signal and is operatively responsive to the input clock to produce a respective one of the plurality of multiphase signals at the second frequency; and
a multiplexer operatively coupled to receive the plurality of multiphase output signals at the first frequency and the plurality of multiphase output signals at the second frequency and operative to select between either plurality of multiphase output signals at the first and second frequencies based upon a multiplexer control signal.

16. The multiphase clock generating circuit of claim 15, wherein each of the plurality of reset delay circuits includes a shift register, wherein the shift register operatively receives the reset control information as input and is triggered by the input clock to produce a respective delayed reset signal from at least one of the plurality of flip-flop circuits.

17. The multiphase clock generating circuit of claim 15 further including a synchronization circuit operatively responsive to a second input clock and the reset control information to produce synchronous reset control information when the reset control information is asynchronous reset control information.

18. The multiphase clock generating circuit of claim 17, wherein the second input clock is a second one of the plurality of multiphase output signals at a first frequency having a different phase than the input clock.

19. The multiphase clock generating circuit of claim 17, wherein the synchronization circuit is a flip-flop circuit.

20. The multiphase clock generating circuit of claim 17, wherein the synchronization circuit is included within each reset delay circuit.

21. The multiphase clock generating circuit of claim 15, wherein each divider circuit is a Johnson divider comprising at least one latch circuit.

22. A bridge circuit operatively coupleable to a memory and operatively coupleable to a host processor, the memory bridge circuit comprising:
   a multiphase clock generator producing a plurality of multiphase output signals at a first frequency; and
   a multiphase divider with delayed reset control, operatively coupled to receive the plurality of multiphase output signals, and operative to produce a plurality of multiphase output signals at a second frequency based on reset control information;
   a multiplexer operatively coupled to receive the plurality of multiphase output signals at the first frequency and the plurality of multiphase output signals at the second frequency and operative to select between either plurality of multiphase output signals at the first and second frequency based upon a multiplexer control signal; and
   wherein the host processor is operatively coupled to receive either the plurality of multiphase output signals at the first frequency or the plurality of multiphase output signals at the second frequency from the multiplexer.

23. The multiphase clock generating circuit of claim 22, wherein the multiplexer control signal is operatively responsive to a predetermined processor boot-up command.

24. The multiphase clock generating circuit of claim 22, wherein the multiphase clock generator is a phase locked loop circuit.

25. The multiphase clock generating circuit of claim 22, wherein the reset control information includes synchronous reset data control.

26. A method for generating multiphase clocks comprising:
   receiving a plurality of multiphase signals at a first frequency;
   producing a plurality of multiphase signals at a second frequency based on reset control information and the plurality of multiphase signals at the first frequency;
   selecting between either plurality of multiphase output signals at the first and second frequencies; and
   sending the selected plurality of multiphase output signals to an interface requiring multiphase clocks.

27. The method of claim 26, wherein the method of selecting between either plurality of multiphase output signals at the first and second frequencies is based upon a control signal in response to a predetermined processor boot-up command.

28. The method of claim 26 wherein the reset control information includes synchronous reset data control.

29. A method for generating multiphase clocks comprising:
   receiving reset control information and an input clock;
   producing at least one delayed reset signal based upon the synchronous control information and the input clock; and
   producing a respective one of the plurality of multiphase output signals at a second frequency for each of the at least one delayed reset signal based upon the input clock and a respective one of the at least one delayed reset signal.

30. The method of claim 29, wherein each of the at least one delayed reset signal represents time-shifted reset control information.

31. The method of claim 29, wherein each of the plurality of multiphase output signals at the second frequency represents a time-shifted, frequency-divided version of the input clock.

32. The method of claim 29, wherein the process of receiving reset control information and an input clock includes synchronizing asynchronous reset control information.

33. A multiphase clock generating circuit comprising:
   a multiphase clock generator operative to produce a plurality of multiphase output signals at a first frequency;
   a multiphase divider with delayed reset control, operatively coupled to recieve at least one of the plurality of multiphase output signals at the first frequency, and operative to produce a plurality of multiphase output signals at a second frequency based on reset control information; and
   a selection means operatively coupled to receive the plurality of multiphase output signals at the first frequency and the plurality of multiphase output signals of the pluraltiy of multiphase output signals at the first frequency and the plurality of multiphase output signals at the second frequency.

34. A multiphase clock generating circuit comprising:
   a multiphase clock generator operative to produce a plurality of multiphase output signals at a first frequency wherein a phase difference with respect to time between each of the plurality of multiphase output signals at the first frequency is based at least on the first frequency; and
   a multiphase divider with delayed rest control, operatively coupled to receive at least one of the plurality of multiphase output signals at the first frequency, and operative to produce a plurality of multiphase output signals at a second frequency based on reset control information.

35. A method for generating multiphase clocks comprising:
   receiving a plurality of multiphase signals at a first frequency;
   producing a plurality of multiphase signals at a second frequency based on reset control information and at least one of the plurality of multiphase signals at the first frequency;
   selecting one or more signals of the plurality of multiphase output signals at the first frequency and the plurality of multiphase output signals at the second frequency; and
   sending the selected one or more signals to an interface requiring multiphase clocks.

36. A method for generating multiphase clocks comprising:
 receiving a plurality of multiphase signals at a first frequency wherein a phase difference with respect to time between each of the plurality of multiphase output signals at the first frequency is based at least on the first frequency; and
 producing a plurality of multiphase signals at a second frequency based on reset control information and at least one of the plurality of multiphase signals at the first frequency.

* * * * *